United States Patent [19]

Geka

[11] Patent Number: 4,986,725
[45] Date of Patent: Jan. 22, 1991

[54] APPARATUS FOR TRANSPORTING MACHINE TOOLS AND WORK TOOLS

[75] Inventor: Toshiaki Geka, Kagamihara, Japan

[73] Assignee: Nippon Thompson Co., Ltd., Tokyo, Japan

[21] Appl. No.: 459,351

[22] Filed: Dec. 29, 1989

[30] Foreign Application Priority Data

Jul. 18, 1989 [JP] Japan .............................. 1-83524[U]

[51] Int. Cl.$^5$ .............................................. B25J 5/02
[52] U.S. Cl. .................................. 414/751; 74/89.15; 74/109; 901/25
[58] Field of Search ........................ 414/749, 751–753; 901/19, 24, 25; 74/109, 89.15; 384/44, 45, 43

[56] References Cited

U.S. PATENT DOCUMENTS

| | | | |
|---|---|---|---|
| 3,892,324 | 7/1975 | Faletti, Jr. ............................ | 414/749 |
| 4,502,737 | 3/1985 | Osawa ................................... | 384/45 |
| 4,714,400 | 12/1987 | Barnett et al. ....................... | 414/751 |
| 4,934,202 | 6/1990 | Hikita et al. ......................... | 74/89.15 |

Primary Examiner—Robert J. Spar
Assistant Examiner—Donald W. Underwood
Attorney, Agent, or Firm—Rogers & Killeen

[57] ABSTRACT

An apparatus for transporting a machine tool such as a robot arm comprises: upper and lower track rails each having a square or circular cross-sectional shape which are horizontally arranged in parallel so as to be away from each other in the vertical direction; and a casing slidably inserted therebetween. Rack tooth trains are formed on the lower surface of the upper track rail and on the upper surface of the lower track rail. The casing has an almost H-shaped cross-sectional shape and comprises a casing main body and two side plates attached at both end surfaces thereof. Rail side track grooves and casing side track grooves are formed on the inner wall surfaces of the track rails and casing main body. Balls are inserted between the corresponding opposite track grooves. A return passage is formed in the casing main body, ball direction turning passages are formed in the side plates, and the return passage is coupled with the casing side track grooves, thereby forming an infinite circulating passage for the balls. A pinion is rotatably arranged at the central position in the longitudinal and transversal directions of the casing main body. When the lower track rail is fixed to the fixed table and the casing main body is moved, the upper track rail moves in the same direction as the casing at the double speed.

6 Claims, 4 Drawing Sheets

APPARATUS FOR TRANSPORTING MACHINE TOOLS AND WORK TOOLS

BACKGROUND OF THE INVENTION

1. Field of the Invention

The present invention relates to a transporting apparatus for easily moving machine tools and work tools such as an arm of an industrial robot and the like.

2. Description of the Related Background Art

Such a kind of conventional technique has been disclosed in, for instance, JP-B-11209.

As will be obviously understood from FIG. 1 in the above official gazette, the above conventional technique is constructed in the following manner. That is, a pair of two right and left track rails which extend in parallel so as to be away from each other in the vertical direction are arranged in the horizontal direction. A pair of track tables are arranged at the upper and lower positions of the track rails. Track grooves are formed on both side surfaces of the track rails and a bearing main body. A relative free sliding apparatus is arranged between the upper and lower track rails through a number of balls inserted between those opposite track grooves. The upper and lower track tables can be mutually, freely, and rectilinearly moved.

However, in the above conventional technique, since the upper and lower track rails are come into engagement by only the ball bearing, the upper and lower track tables are not interlocked. Therefore, there is a drawback such that in the relative movement, there is no regularity of the positional relations among the bearing main body, the fixed table, and the movable table.

Thus, in the worst case, for instance, when the slide resistance between the fixed table and the bearing main body is fairly larger than that between the movable table and the bearing main body, if the movable table is moved, the positions of the fixed table and bearing main body do not change but only the movable table slides. In a state in which the movable table moved to the midway of the maximum stroke, for instance, by about ¼ thereof, the main body reaches the end portion of the movable table. There is a problem such that the distortion of the front edge portion of the movable table in such a state becomes maximum.

To solve the above problems, in addition to an apparatus to drive the movable table, it is necessary to additionally provide an apparatus to control the position of the bearing main body. There is also a problem of an increase in costs.

SUMMARY OF THE INVENTION

It is an object of the present invention to solve the drawbacks in the conventional technique and to provide an apparatus for transporting machine tools and work tools such as a double-speed robot arm and the like which has the simplest mechanism and the high rigidity and can be cheaply manufactured and can accurately move forwardly and backwardly one of track rails (the robot arm can be also attached to the front edge portion thereof).

According to the present invention, the above object is accomplished by an apparatus for transporting machine tools and work tools, comprising a pair of track rails (1a, 1b) and a casing (4) which is fitted between the track rails (1a, 1b) so as to be slidable in an axial direction, wherein:

the track rails (1a, 1b) are arranged so as to be away from each other in the vertical direction at upper and lower positions and track grooves (2a, 2b) for balls (7) as rolling members are formed on both side surfaces of the track rails (1a, 1b) at symmetrical positions on cross-sectional views of the track rails;

rack tooth trains (3a, 3b) which extend in the longitudinal direction are formed on a lower surface of the upper track rail (1a) and on the upper surface of the lower track rail (1b);

the casing (4) has an almost H-shaped cross-sectional shape and comprises a casing main body (4-1) and two side plates (5) which are fixedly attached to both end surfaces in the transversal direction of the casing main body;

a lower portion of the upper track rail (1a) is fitted into upper concave portion grooves (4c) of the casing (4) and an upper portion of the lower track rail (1b) is fitted into lower concave portion grooves (4d) of the casing (4);

casing side track grooves (4a, 4b) which face the rail side track grooves (2a, 2b) are formed on opposite inner wall surfaces of the casing concave portion grooves (4c, 4d), respectively;

a number of balls (7) are inserted among the casing side track grooves (4a, 4b) and the rail side track grooves (2a, 2b) which face the casing side track grooves (4a, 4b);

a return passage (4-2) which extends in parallel with the casing side track grooves (4a, 4b) is formed in the casing main body (4-1) and ball direction turning passages (5a) are formed in the side plates (5) attached to both ends of the casing main body (4-1);

the return passage (5a) and the casing side track grooves (4a, 4b) are coupled to thereby construct an infinite circulating passage (6) for the balls (7); and a pinion (8) is rotatably arranged in substantially the central position in the longitudinal and transversal directions of the casing main body (4-1) and the pinion (8) and the rack tooth trains (3a, 3b) are come into engagement with each other so that the track rails (1a, 1b) are movable.

In the above apparatus, each of the pair of track rails (1a, 1b) has an almost square or circular cross-sectional shape.

According to another aspect of the invention, in the above transporting apparatus, ball screw nut means (9) is fixedly attached to one of the side surfaces in the longitudinal direction of the casing main body (4-1).

a ball screw shaft (10) which extends in parallel with the track rails (1a, 1b) is rotatably threadably inserted into the nut means (9), one end of the ball screw shaft (10) is coupled with an output shaft of a stepping motor (11), a machine tool (13) such as a robot hand is attached to an end portion of the upper track rail (1a) locating in the direction of the other end of the ball screw shaft (10), and the lower track rail (1b) is fixedly attached to a fixed table (12).

In the above transporting apparatus, one of the two upper and lower track rails (1a, 1b) is fixed onto a fixed table (12), and when the casing main body (4-1) is rectilinearly moved, the other track rail moves in the same direction as the casing main body at a speed which is twice as high as a moving speed of the casing main body.

On the other hand, when the nut means (9) is moved forwardly or backwardly through the ball screw shaft (10) by driving the stepping motor (11), the robot hand (13) of the upper track rail (1a) is moved forwardly or backwardly at a speed which is twice as high as the moving speed of the nut means (9), that is, the casing main body (4-1).

The above and other objects and features of the present invention will become apparent from the following detailed description and the appended claims with reference to the accompanying drawings.

DETAILED DESCRIPTION OF THE PREFERRED EMBODIMENTS

Figure 1:
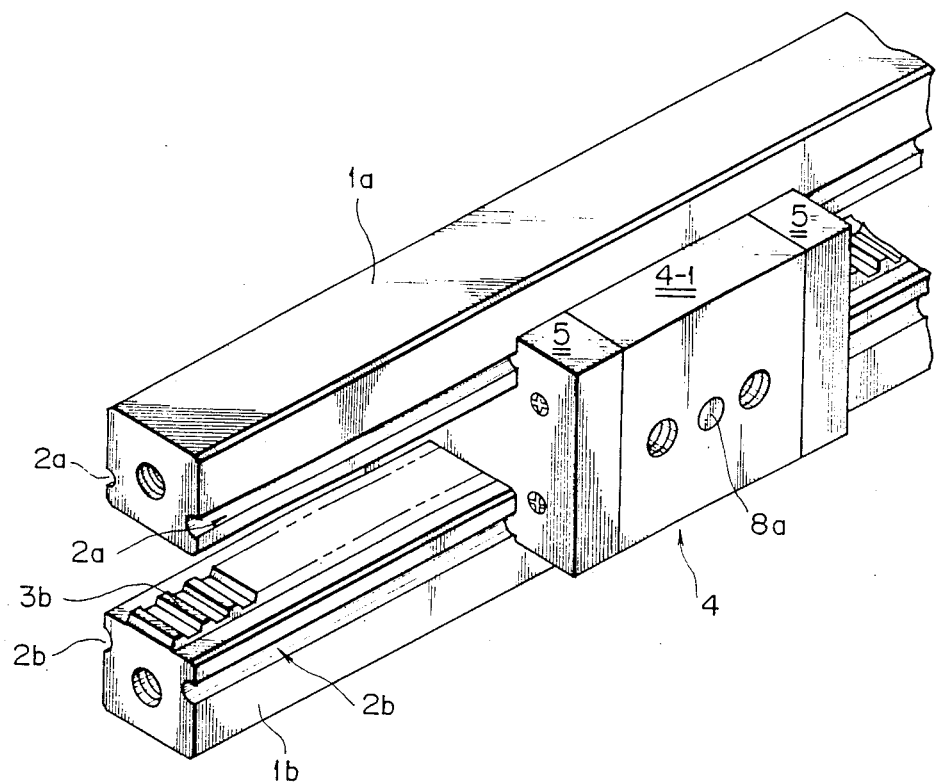
FIG. 1 is a perspective view of a whole apparatus of the first embodiment of the present invention.
Figure 2:
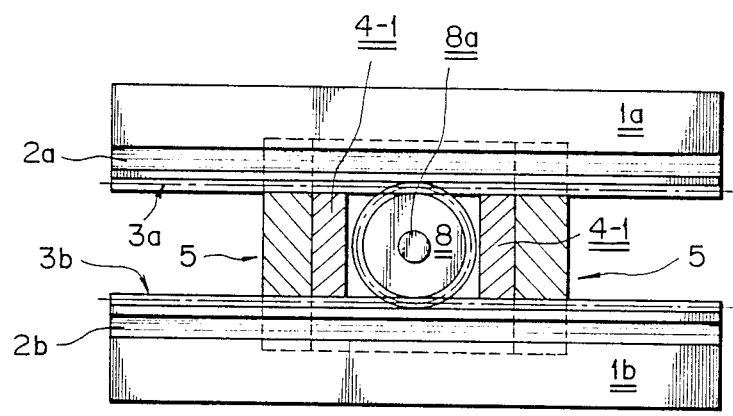
FIG. 2 is a side elevational view of FIG. 1.
Figure 3:
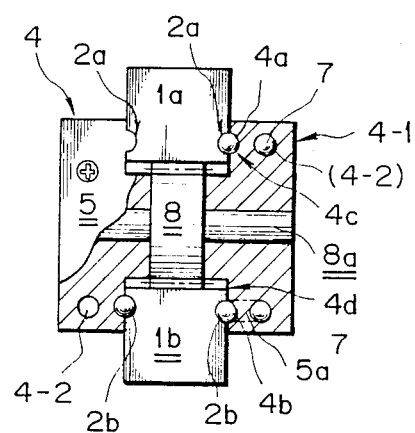
FIG. 3 is a front view of FIG. 1 with a part cut away.
Figure 4:
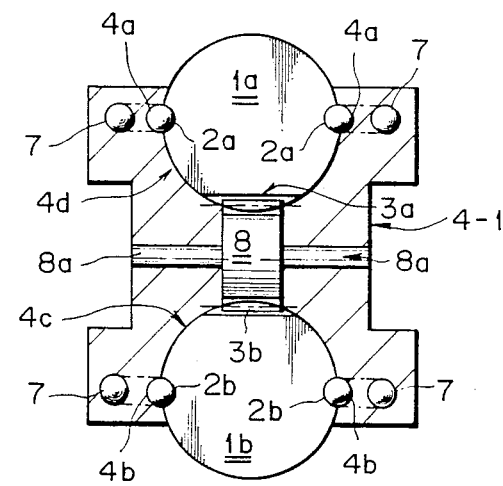
FIG. 4 is a cross-sectional view of the second embodiment of the invention.
Figure 5:
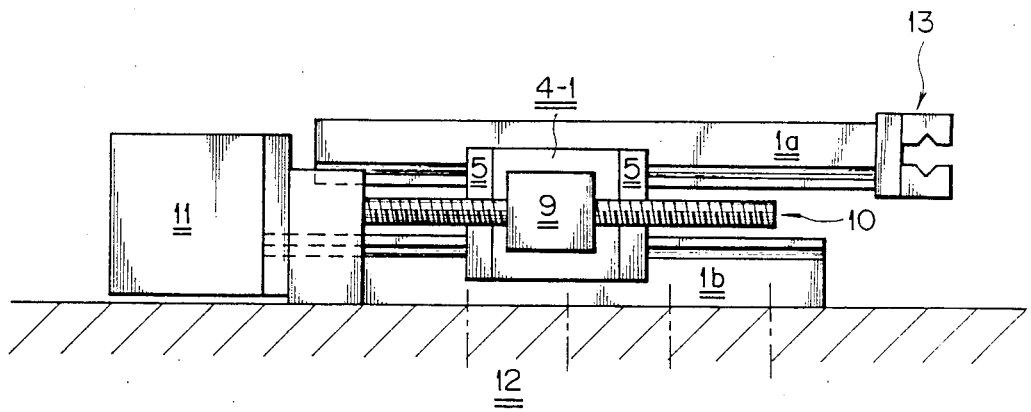
FIG. 5 is a side elevational view of an example of an application in the case where a robot arm and a stepping drive motor are attached to the apparatus of the first embodiment of the invention.

FIGS. 1 to 5 show embodiment of the present invention. FIGS. 1 to 3 show the first embodiment. FIG. 4 shows the second embodiment of the invention. FIG. 5 shows the first example of an application of the invention using the first embodiment.

Referring now to FIG. 1, a pair of long track rails 1a and 1b each having an almost square cross section are arranged and extended in parallel in the horizontal direction so as to be away from each other by an equal distance at the upper and lower positions in the vertical direction. Track grooves 2a and 2b are formed on both side surfaces of the two upper and lower track rails 1a and 1b at the symmetrical positions in the transversal direction.

As shown in FIGS. 1 and 3, a casing 4 comprises a casing main body 4-1 having an almost H-shaped cross section and two side plates 5 each having the same almost H-shaped cross section as that of the casing main body 4-1. The side plates 5 are attached at both edge surfaces in the transversal direction of the casing main body 4-1. The lower portion of the upper track rail 1a is fitted into upper concave portion grooves 4c shown by the H-shaped cross section. The upper portion of the lower track rail 1b is fitted into lower concave portion grooves 4d shown by the H-shaped cross section. Both of the upper and lower track rails 1a and 1b are held at the upper and lower positions in the vertical direction through the casing 4 so as to extend in parallel in the horizontal direction at a predetermined distance away from each other. As shown in FIGS. 3 and 4, casing side track grooves 4a which face the rail side track grooves 2a are formed in the longitudinal direction on the opposite inner wall surfaces of the upper concave portion grooves 4c of the casing 4. Casing side track grooves 4b which face the rail side track grooves 2b are also similarly formed in the longitudinal direction on the opposite inner wall surfaces of the lower concave portion grooves 4d of the casing 4. A number of balls 7 as rolling members are inserted into the tracks which are formed among both of the track grooves 2a, 4a, 2b, and 4b on the rail side and the casing side, respectively. In this manner, a ball linear motion rolling guide unit is formed between each of the track rails 1a and 1b and the casing 4.

In the first embodiment of the invention, as shown in FIGS. 3 and 4, in the casing main body 4-1, a ball return passage 4-2 which extends in the longitudinal direction in parallel with the casing side track grooves 4a and 4b at the same horizontal position as the track grooves 4a and 4b when seeing on the cross-sectional view of the casing is further formed in the opposite walls of the upper and lower concave portion grooves 4c and 4d of the casing 4. Both end portions of the casing side track grooves 4a and 4b and the ball return passage 4-2 are coupled by ball direction turning passages 5a formed in the side plates 5 which are fixedly attached to both end portions of the casing main body 4-1. Thus, an infinite circulating passage 6 (not shown) for ball circulation is formed in the casing 4.

As will be clearly understood from the first embodiment shown in FIGS. 1 to 4, especially from FIG. 1, rack tooth trains 3a and 3b are formed in the longitudinal direction of the central portions on the lower surface of the upper track rail 1a and on the upper surface of the lower track rail 1b, respectively. A pinion 8 is rotatably arranged in substantially the central position in the longitudinal and transversal directions of the casing main body so as to be threadably come into engagement with the rack tooth trains 3a and 3b.

When one of the two upper and lower track rails (that is, the lower track rail 1b in the case of FIG. 5) is fixed to a work table and the casing main body 4-1 is rectilinearly moved, the other track rail (upper track rail 1a in the example) moves at a speed which is twice as high as the moving speed of the main body in the same direction as the main body due to the threadable engagement between the rack tooth trains 3a and 3b and the pinion 8.

In FIGS. 2 and 3, as a method of holding the pinion, there has been shown a type in which the pinion is held by a slide bearing using a pin. However, its is also possible to construct in a manner such that a rolling guide unit is inserted into the pin portion and the pinion is held while reducing the friction. Such a holding method can be realized by various well-known techniques.

In the first embodiment, a whole shape of each of the track rail is set to an almost square pillar shape having a square cross-sectional shape. However, the invention is not limited to such a shape. As a second embodiment (see FIG. 4), it is also possible to use a ball spline shaft in which a whole shape of each of the track rail is almost cylindrical and has a circular cross-sectional shape. In such a case, a robot hand or the like which is attached to the edge surface of the track rail can be more easily assembled.

On the other hand since the track rail has a circular cross-sectional shape, it can be easily worked and finished with a high precision.

FIG. 5 shows the first example of an application as a robot arm of the invention. FIG. 5 shows the case of using an apparatus of a combination of a pair of track rails and one casing main body.

Ball screw nut means 9 is attached to one of the side surfaces in the longitudinal direction of the casing main body 4-1. A ball screw shaft 10 is inserted into the nut means 9 in parallel with the track rails so as to be movable in the longitudinal direction. One end of the ball screw shaft 10 is coupled with an output shaft of a stepping motor 11. A robot hand 13 is attached to one end of the track rail 1a. The lower track rail 1b is fixed to the fixed table from the bottom by a bolt. In the above construction, when the nut means 9 is moved forwardly or backwardly through the ball screw shaft 10 by the driving of the stepping motor 11, the robot hand 13 of the upper track rail 1a moves forwardly or backwardly at a speed which is twice as high as the moving speed of the nut means 9, that is, the casing main body 4-1. The moving position of the robot hand 13 can be also accurately controlled.

As other examples of the application of the invention, the invention can be also effectively applied to an XY table in the conventional example, a slide portion to adjust opening or closing amounts of fingers of the robot hand, and a projected fork slide portion.

Since the upper and lower track rails are interlockedly moved through the rack tooth trains due to the pinion provided in the casing main body 4-1, a regularity can be given to the movements of the upper and lower track rails.

Since the casing main body is fitted and mounted by the rack and pinion in addition to the supporting construction at four points by the balls as rolling members, a distortion due to the relative movement of the track rails and the casing is very small and the precision of the rectilinear motion is high.

Ordinarily, since one of the upper and lower track rails is fixed and used, a work tool such as a robot arm or the like can be accurately moved at the double speed.

Since the structure is simple, the positions of the track rails can be easily certainly controlled and the apparatus can be cheaply manufactured.

The invention can be widely applied to various kinds of slide apparatuses.

The present invention is not limited to the foregoing embodiments but many modifications and variations are possible within the spirit and scope of the appended claims of the invention.

What is claimed is:

1. An apparatus for transporting machine tools and work tools,
    comprising a pair of track rails (1a, 1b) and a casing (4) which is fitted between said track rails (1a, 1b) so as to be slidable in an axial direction, wherein:
    the track rails (1a, 1b) are arranged in parallel so as to be away from each other in the vertical direction at upper and lower positions and track grooves (2a, 2b) for balls (7) as rolling members are formed on both side surfaces of the track rails (1a, 1b) at symmetrical positions on cross-sectional views of the track rails;
    rack tooth trains (3a, 3b) which extend in the longitudinal direction are formed on a lower surface of the upper track rail (1a) and on the upper surface of the lower track rail (1b);
    said casing (4) has an almost H-shaped cross-sectional shape and comprises a casing main body (4-1) and two side plates (5) which are fixedly attached to both end surfaces in the transversal direction of the casing main body;
    a lower portion of the upper track rail (1a) is fitted into upper concave portion grooves (4c) of the casing (4) and an upper portion of the lower track rail (1b) is fitted into lower concave portion grooves (4d) of the casing (4);
    casing side track grooves (4a, 4b) which face the rail side track grooves (2a, 2b) are formed on opposite inner wall surfaces of the casing concave portion grooves (4c, 4d), respectively;
    a number of balls (7) are inserted among the casing side track grooves (4a, 4b) and the rail side track grooves (2a, 2b) which face the casing side track grooves (4a, 4b);
    a return passage (4-2) which extends in parallel with the casing side track grooves (4a, 4b) is formed in the casing main body (4-1) and ball direction turning passages (5a) are formed in the side plates (5) attached to both ends of the casing main body (4-1);
    the return passage (5a) and the casing side track grooves (4a, 4b) are coupled to thereby construct an infinite circulating passage (6) for the balls (7); and
    a pinion (8) is rotatably arranged in substantially the central position in the longitudinal and transversal directions of the casing main body (4-1) and the pinion (8) and the rack tooth trains (3a, 3b) are come into engagement with each other so that the track rails (1a, 1b) are movable.

2. An apparatus according to claim 1, wherein each of said pair of track rails (1a, 1b) has an almost square cross-sectional shape.

3. An apparatus according to claim 1, wherein each of said pair of track rails (1a, 1b) has an almost circular cross-sectional shape.

4. An apparatus according to claim 1, wherein ball screw nut means (9) is fixedly attached to one of the side surfaces in the longitudinal direction of the casing main body (4-1),
    a ball screw shaft (10) which extends in parallel with the track rails (1a, 1b) is rotatably threadably inserted into the nut means (9),
    one end of the ball screw shaft (10) is coupled with an output shaft of a stepping motor (11),
    a machine tool (13) such as a robot hand is attached to an end portion of the upper track rail (1a) locating in the direction of the other end of the ball screw shaft (10), and
    the lower track rail (1b) is fixedly attached to a fixed table (12).

5. An apparatus according to claim 1, wherein one of the two upper and lower track rails (1a, 1b) is fixed onto a fixed table (12), and when the casing main body (4-1) is rectilinearly moved, the other track rail moves in the same direction as the casing main body at a speed which is twice as high as a moving speed of the casing main body.

6. An apparatus according to claim 4, wherein when the nut means (9) is moved forwardly or backwardly through the ball screw shaft (10) by driving the stepping motor (11), the robot hand (13) of the upper track rail (1a) is moved forwardly or backwardly at a speed which is twice as high as the moving speed of the nut means (9), that is, the casing main body (4-1).

* * * * *